(12) United States Patent
VanderZee

(10) Patent No.: US 10,298,501 B2
(45) Date of Patent: May 21, 2019

(54) SYSTEM, DEVICE, AND METHOD FOR COMMUNICATING DATA OVER A MESH NETWORK

(71) Applicant: TRANE INTERNATIONAL, INC., Piscataway, NJ (US)

(72) Inventor: Joel C VanderZee, La Crosse, WI (US)

(73) Assignee: TRANE INTERNATIONAL, INC., Davidson, NC (US)

( * ) Notice: Subject to any disclaimer, the term of this patent is extended or adjusted under 35 U.S.C. 154(b) by 325 days.

(21) Appl. No.: 14/634,048

(22) Filed: Feb. 27, 2015

(65) Prior Publication Data

US 2015/0244611 A1  Aug. 27, 2015

Related U.S. Application Data

(60) Provisional application No. 61/945,512, filed on Feb. 27, 2014.

(51) Int. Cl.
*H04L 12/761* (2013.01)
*H04L 12/801* (2013.01)
*H04L 12/18* (2006.01)

(52) U.S. Cl.
CPC ............ *H04L 47/17* (2013.01); *H04L 12/189* (2013.01); *H04L 12/1877* (2013.01); *H04L 12/1886* (2013.01)

(58) Field of Classification Search
CPC .... H04W 60/56; H04L 47/17; H04L 12/1877; H04L 12/1886; H04L 12/189
See application file for complete search history.

(56) References Cited

U.S. PATENT DOCUMENTS

| 6,894,990 | B1 | 5/2005 | Agarwal et al. |
| 7,760,649 | B2 | 7/2010 | Song |
| 8,385,345 | B2 | 2/2013 | Ji et al. |
| 8,509,150 | B2 | 8/2013 | Bahr |
| 2002/0007374 | A1* | 1/2002 | Marks ............... H04L 12/18 709/203 |
| 2006/0013169 | A2 | 1/2006 | Boynton |
| 2006/0271244 | A1 | 11/2006 | Cumming et al. |
| 2007/0155368 | A1* | 7/2007 | Phelan ............. H04W 8/245 455/412.1 |

(Continued)

FOREIGN PATENT DOCUMENTS

| EP | 2058979 A2 | 5/2009 |
| GB | 2500450 A | 9/2013 |
| KR | 10-2009-0012947 | 4/2009 |

OTHER PUBLICATIONS

International Search Report and Written Opinion, dated May 26, 2015; PCT/US2015/018060 (12 pages).

(Continued)

*Primary Examiner* — Melvin C Marcelo
(74) *Attorney, Agent, or Firm* — Hamre, Schumann, Mueller & Larson, P.C.

(57) ABSTRACT

Devices and computer-implemented methods for controlling data communication to one or more devices in a network, e.g., a mesh network. The methods include a device broadcasting data requested by a first device, and a second device eavesdropping on the broadcast of the data in order to capture the data and to storing the captured data if the data is appropriate for the second device.

14 Claims, 3 Drawing Sheets

(56) References Cited

U.S. PATENT DOCUMENTS

| | | | |
|---|---|---|---|
| 2008/0002599 A1 | 1/2008 | Yau et al. | |
| 2009/0274083 A1* | 11/2009 | Wentink | H04W 8/005 370/311 |
| 2010/0070963 A1* | 3/2010 | Bae | H04W 8/245 717/171 |
| 2010/0302970 A1 | 12/2010 | Lau et al. | |
| 2011/0106961 A1 | 5/2011 | Glasser et al. | |
| 2011/0197187 A1* | 8/2011 | Roh | G06F 8/65 717/173 |
| 2011/0210816 A1 | 9/2011 | Wang | |
| 2012/0131324 A1* | 5/2012 | Ansari | H04Q 9/00 713/100 |
| 2012/0158979 A1* | 6/2012 | Lee | H04W 48/20 709/229 |
| 2013/0188492 A1 | 7/2013 | Gorgen et al. | |
| 2013/0279410 A1 | 10/2013 | Dublin et al. | |
| 2013/0336316 A1 | 12/2013 | Sudhaakar et al. | |
| 2014/0028468 A1* | 1/2014 | Grady | G08C 15/00 340/870.03 |
| 2014/0064296 A1 | 3/2014 | Haeupler et al. | |
| 2014/0171108 A1* | 6/2014 | Waters | H04W 4/02 455/456.1 |
| 2014/0282486 A1* | 9/2014 | Hisamoto | G06F 8/65 717/173 |
| 2015/0271247 A1* | 9/2015 | Patsiokas | H04W 4/70 709/217 |
| 2016/0205662 A1* | 7/2016 | Cormier | H04W 8/245 370/312 |

OTHER PUBLICATIONS

Extended European Search Report, European Patent Application No. 15754694.6, dated Feb. 9, 2017 (8 pages).

* cited by examiner

SYSTEM, DEVICE, AND METHOD FOR COMMUNICATING DATA OVER A MESH NETWORK

FIELD

This disclosure generally relates to systems, devices, and methods for data transmission and control of data transmission between network devices of a network which includes, for example, a mesh network (e.g., a network using ZigBee wireless standard).

BACKGROUND

Generally, a node of a mesh network (e.g., a mesh radio network, a network using ZigBee standard IEEE 802.15.4, etc.) can communicate with another node in the network via a direct node-to-node communication (i.e., unicast). Unicasting involves the node preparing data (e.g., piece of data, data packet, etc.) with a destination address (e.g., identification information) of the receiver node as a part of the data, and then transmitting that data. Thus, the data itself is designated for a specific destination address (e.g., a specific node). Accordingly, even if the node is communicating to multiple nodes (i.e., multicast) in the mesh network, the data is prepared with destination addresses of the specific nodes that are to ultimately receive and use the data. This ensures that only the nodes that are predetermined by the sender ultimately receive and use the data.

Thus, if another node (i.e., not predetermined to be the recipient of the data) in the network receives the data, that node reads the destination address to see whether the destination address corresponds with that of the node. If the destination address corresponds with that of the node, the node saves and executes the entire data. The node does not transmit that data to any other node.

However, if the destination address does not correspond with that of the node, the node can simply delete the data from memory. The node can be configured to transmit such data so that there is a chance that the data can be transmitted to the proper node at the destination address embedded in the data.

If a plurality of nodes of the mesh network requires the same data, such as for example, firmware update data, the data can be transmitted from one node to another via the node-to-node communication. Accordingly, the process of distributing the data can involve communication from a first node to a second node. Further, even when the second node has the most recent firmware, it might be required to receive and resend the firmware update data so other nodes (e.g., a third node) can receive the data. Thus, transmission and retransmission of the same data can occur throughout at least a significant portion of the mesh network.

One of the nodes in a mesh network can be a system controller device. A system controller device (e.g., coordinator device) can queue the other nodes for communication and send data to each of the nodes, one by one. Such serial process can require the data be sent from the system controller device to a first node, and then from the first node to a second node, and so on. That is, even when the system controller device controls and coordinates the communication of the data to the nodes, one-by-one, one of the nodes may have to relay the same data more than once. That is, the transmission of the data may require multiple "hops" through the network. Thus, there can be a situation wherein the same data is transmitted more than once between and/or through one or more nodes. This kind of communication process requires queuing of every node by the controller device to transmit the same data to each of the destination nodes.

Another example of a communication process in the mesh network is via a broadcast communication, where a system controller device broadcasts the data to the nodes, and the nodes that are within range of the broadcast can receive the data. In order to transmit the data to the nodes that are outside the broadcast range from the system controller device, the nodes that have received the data can rebroadcast the data.

SUMMARY

The embodiments disclosed herein are directed towards systems, devices, and methods for improving the transmission of data over a network. It has been found that there are deficiencies in a network where a system controller device relies on queuing a plurality of nodes (or devices) for sending data to each node, one by one, where the data is the same data. Because the general process described above requires the controller device to transmit multiple pieces of data over and over again to multiple nodes (even when the data is the same data), the general process can consume a large amount of time. For example, updating thirty wireless nodes in a general mesh network using the above-described general process can take several hours. The efficiency of this process is inefficient due to, for example, for nodes that are distant from the system controller device, each data packet must be transmitted multiple times (e.g., over multiple "hops"), even when the data packet (or all of the data formed by the data packets) has already been sent to the nodes that are in-between the system controller device and the destination node.

The disclosure herein describes network communication methods and systems having one or more devices, wherein the transmission of data to each of the nodes in the network can be improved.

An embodiment of the method includes a communication process performed by one or more nodes in a network, wherein the method does not require and does not include data tracking by the one or more nodes. That is, for a network using, for example, the ZigBee standard, tracked broadcasts can be a roadblock to communicating/transmitting data to the nodes. In a ZigBee network, the tracking of broadcast packets is generally performed by both the sender device and the receiver device(s) to detect repeats of previously sent or received broadcast packets for some time period. For example, the ZigBee standard generally requires that a sender device (which can be one of the nodes) transmits broadcast data packets three times with one second intervals therebetween. The embodiment eliminates data tracking of the broadcast data for ZigBee (i.e., the embodiment is a modified ZigBee standard so that untracked broadcasts can function with the nodes in the ZigBee network).

An embodiment of the method includes a communication process performed by one or more nodes in a network, wherein a first node unicasts (not broadcasts) to a second node (e.g., a controller) for data (e.g., firmware update data).

When the second node receives the unicasted request sent from the first node, the second node broadcasts (not unicasts) the requested data (e.g., without a specific destination address embedded in the data). The first node receives the broadcasted data, stores the data, and/or executes the data, etc.

In the meantime, one or more of other nodes, a third node for example, can receive the broadcasted data and store it to a non-transitory memory of the third node. That is, the third node "eavesdrops" on the broadcast from the second node that is in response to a request for the data from the first node. Although the third node has not sent a request for such data, the third node's processor is configured to execute computer-executable instructions to determine whether the data is appropriate for the third node. When the third node determines that the data received via broadcast from the first node is appropriate for the third node (e.g., the data received via broadcast is a firmware update for the same model, make, device type, etc.), the processor of the third node saves the data to a non-transitory memory. Thus, if another node (e.g., the controller device) sends a communication to the third node to see whether the third node requires the data (e.g., firmware update, etc.), the third node can communicate to the controller that the third node already has the data. Even if the third node does not have the complete data (e.g., has some data packets but not all of the packets), the third node can request (via unicast and/or broadcast) for only the missing pieces of the data. Thus, the embodiment of the process of communicating in the network can significantly improve network traffic and the time needed for sending the same data to multiple node devices in the network. Further, advantageously, the second node (e.g., controller) does not have to keep track of the nodes that have been sent the data (e.g., firmware update) via unicast. The second node can simply broadcast the data as the request for the data (or pieces of the data) is received by the second node.

In an embodiment, the data that is broadcast does not have a specific destination address embedded in the data.

In an embodiment, the data that is broadcast has a specific destination address embedded in the data, but a processor of a node is configured to ignore the specific destination address and make a determination as to whether the data received via broadcast is appropriate for the node without considering the destination address portion of the broadcast data.

When a second node receives the broadcasted request sent from the first node, the second node broadcasts the requested data (e.g., without a specific destination address embedded in the data). The first node receives the broadcasted data, stores the data, and/or executes the data, etc.

In another embodiment of the method, the first node broadcasts (and not unicasts) to the network for data (e.g., firmware update data).

In an embodiment, the communication method includes one or more transmission of data between a controller device and a first node which determines which data (e.g., data packet, piece of data, etc.) is to be communicated by the controller device to the first node.

In an embodiment, the communication by the controller device to the first node is via broadcast.

In an embodiment, the communication by the controller device to the first node is via wireless broadcast.

In an embodiment, the controller device broadcasts the data requested by the first node.

In an embodiment, the controller device broadcasts the data requested by the first node wirelessly.

In an embodiment, the controller device broadcasts the data requested by the first node via photons and/or radiation.

In an embodiment, first node receives the data that has been broadcasted from the controller device.

In an embodiment, the first node does not perform a tracking function of the data.

In an embodiment, the controller does not perform a tracking function of the data.

In an embodiment, one or more other nodes (i.e., nodes other than the first node) receive the data broadcasted from the controller device, and the one or more other nodes save the data into the respective node's memory.

In an embodiment, the one or more other nodes do not perform a tracking function of the data.

DETAILED DESCRIPTION

This disclosure is directed to systems, devices, and methods for communicating data to devices in a network. FIGS. 1-5 show exemplary schematic diagrams of the network 10 (connections shown as broken lines) according to different embodiments.

Figure 1:
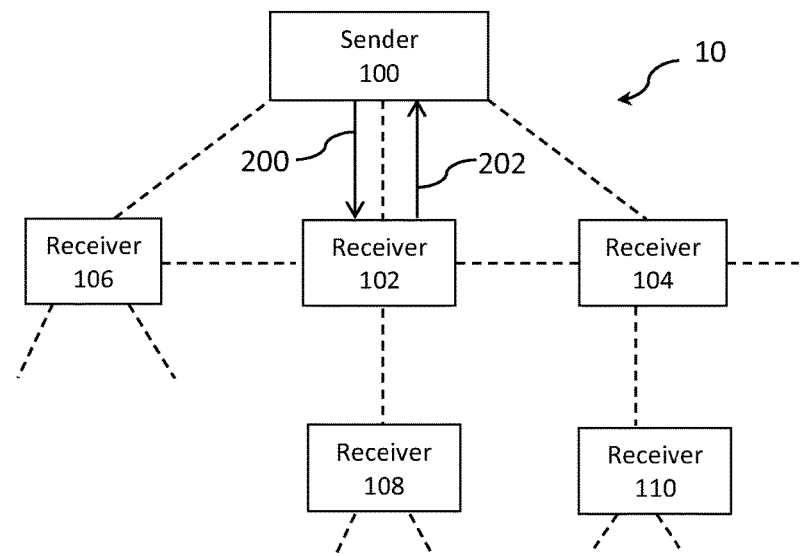
FIGS. 1-5 illustrate an exemplary schematic diagram of a network, according to different embodiments of the methods.
Figure 6:
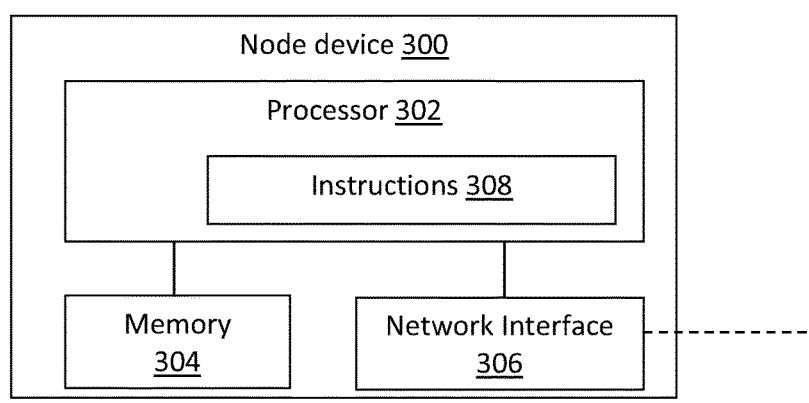
FIG. 6 illustrates an exemplary schematic diagram of an embodiment of a node device.

FIG. 1 shows the network 10, which can be or include a wired network, wireless network, wireless radio network, mesh network, etc. The first node or device 100 can be a source of data. Accordingly the first node 100 can be identified as a sender device, a controller device, etc. In this example, the other devices connected to the network 10 can be identified as nodes or receiver devices 102, 104, 106, 108, 110. The receiver devices 102, 104, 106 are one "hop" away from the sender device 100. The receiver devices 108, 110 are two "hops" away from the sender device 100. Accordingly, data transmitted from the sender device 100 that is specifically destined for the receiver device 108 can go through the receiver device 102, which is retransmitted by the receiver device 102 to the receiver device 108. It is to be understood that additional devices can be connected to the network 10 which require additional "hops" from the sender device 100. It is understood that the devices 100, 102, 104, 106, 108, 110 in the network 10 are specialized computer devices, wherein each of the devices 100, 102, 104, 106, 108, 110 includes a processor, a non-transitory memory, a network interface, and other components one skilled in the art understands are inherently required for the operation of the systems, devices, and methods for communicating data via the network 10 (e.g., FIG. 6 shows further details and they are described below). Accordingly, portions or all of the methodology and/or processes described herein can be computer-readable and/or computer-executable instructions which can be stored in one or more non-transitory memories and/or executed by one or more processors of respective devices 100, 102, 104, 106, 108, 110 in the network 10.

One or more of the receiver devices 102, 104, 106, 108, 110 are configured to receive broadcast data via their respective network interfaces, and they can also be configured to broadcast the data. Accordingly, one or more of the receiver devices 102, 104, 106, 108, 110 can be a sender device as well. Specifically, the broadcast data can be wireless, radio frequency, or other means using radiation, photons, etc. Further, one or more of the nodes 100, 102, 104, 106, 108, 110 can be configured to not track the broadcast data. The elimination of the tracking process at the nodes 100, 102, 104, 106, 108, 110 can eliminate the time delay (e.g., around 10 seconds) associated with tracking processes.

The sender device 100 can communicate 200 with the receiver device 102 to determine what or which pieces of data the receiver device 102 requires and/or needs. In response to the communication 200, the receiver device 102 can communicate 202 to the sender device 100 a data request. The data request can be, for example, a request for a particular piece of data, a list of pieces of data, one or more data packets, etc. For example, the data request can be a request for firmware update data pieces 1-5 for device type A, which might be a particular firmware update which the receiver device 102 having type A needs.

Figure 2:
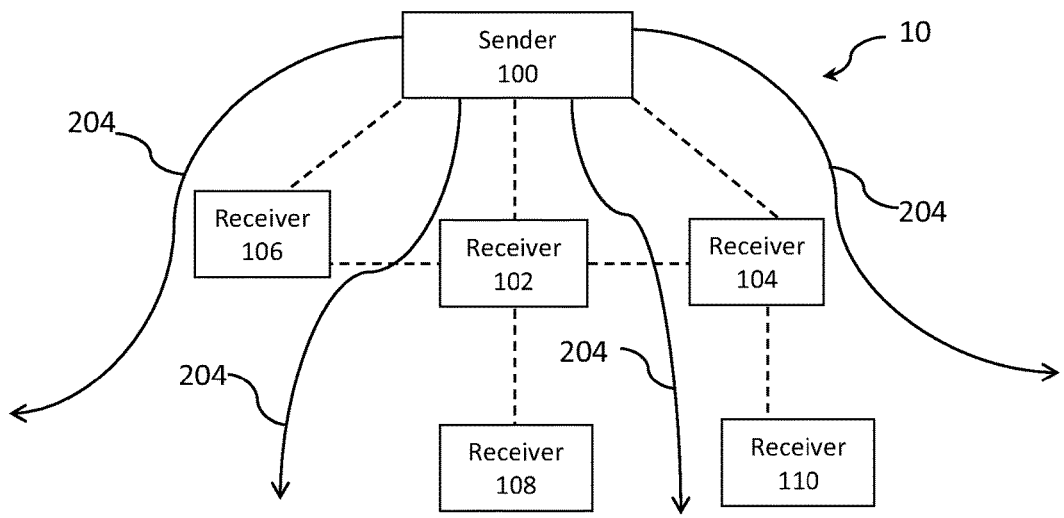

FIG. 2 shows the sender device 100 transmitting 204 (e.g., broadcasting wirelessly) the data requested by the receiver device 102. The sender device 100 does not need to consider what the other receiver devices 104, 106, 108, 110 require at this time. The data transmitted by the sender device 100 can be received by the receiver device 102 as well as the other receiver devices 104, 106, 108, 110. The other receiver devices 104, 106, 108, 110, if they are in range of the broadcast 204, can "eavesdrop" on this transmission. That is, although the broadcast data from the sender device 100 is in response to and for the receiver device 102, the other receiver devices 104, 106, 108, 110 are configured to receive the data. It is not necessary that the data which are received by the eavesdropping nodes are sequentially received. That is, the eavesdropping nodes can receive and store data in any order. The other devices 104, 106, 108, 110 can determine whether the received data (e.g., firmware update data pieces 1-5 for device type A) is appropriate. That is, if one or more of the other devices 104, 106, 108, 110 are of the type A, then that device can determine that the received data is useful and store that data to the non-transitory memory. If a particular device determines that the received data is not useful because the device is, for example type B, then the received data is not stored in the non-transitory memory (or if already stored in the non-transitory memory, the data is deleted from the non-transitory memory).

Figure 3:
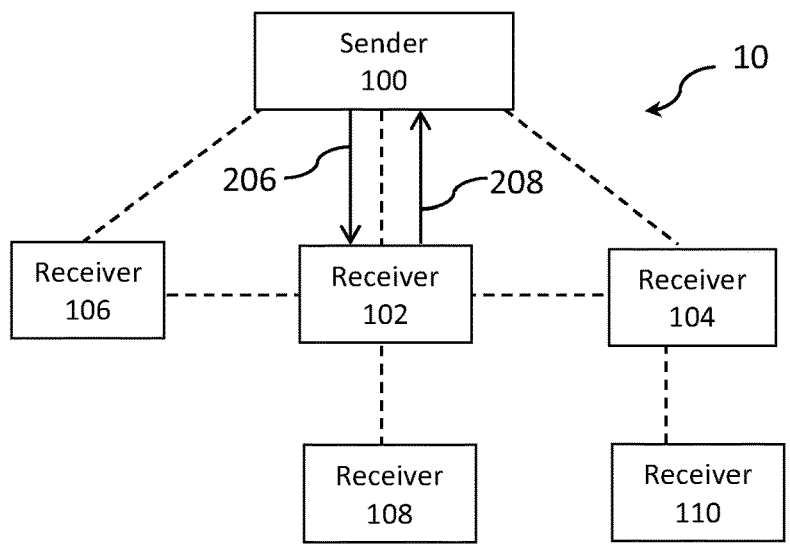

FIG. 3 shows the sender device 100 communicating 206 with the receiver device 102 to verify whether the receiver device 102 has received all of the requested data and/or, similar to step 200 in FIG. 1, the sender device 100 can communicate 206 with the receiver device 102 again to determine what pieces of data the receiver device 102 requires and/or needs. In response to the communication 206, the receiver device 102 can communicate 208 to the sender device 100 another data request or communicate that all needed data have been received. If the receiver device 102 requests additional or repeat of specific data (e.g., firmware update data piece 3 of 5 for device type A, because only that piece was not fully received in the last broadcast), the sender device 100 can perform another data broadcast. This can continue until the receiver device 102 communicates to the sender device 100 that all of the data requested have been completely received by the receiver device 102. During any of these repeated broadcasts by the sender device 100, the other receiver devices 104, 106, 108, 110 can continue to receive and store the data broadcasted by the sender device 100 (similar to shown in FIG. 2 and described above).

Figure 4:
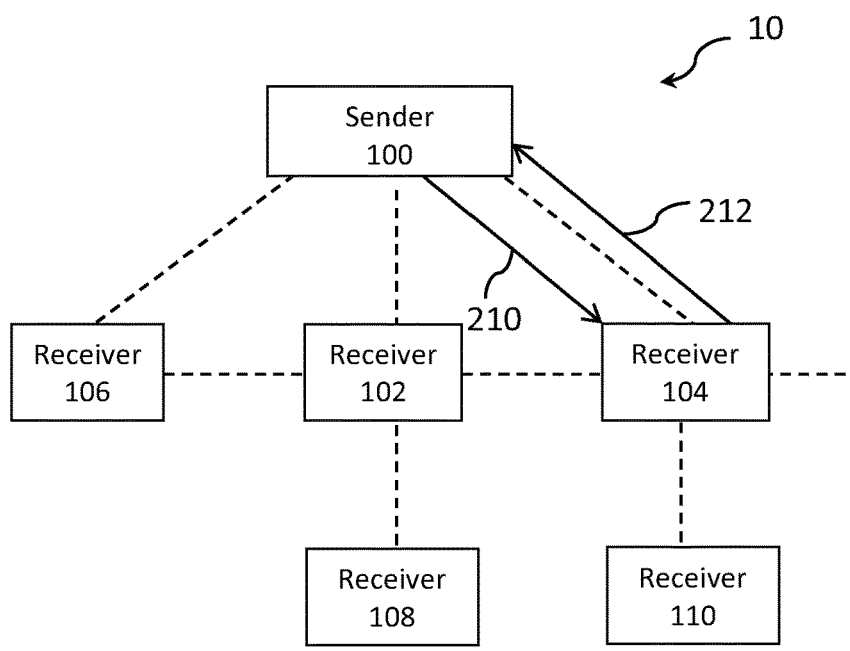

FIG. 4 shows the sender device 100, having determined that the receiver device 102 requires no more data from the sender device 100, communicates 210 with the receiver device 104 to determine what or which pieces of data the receiver device 104 requires and/or needs. In response to the communication 210, the receiver device 104 can communicate 212 to the sender device 100 a data request. The data request can be, for example, a request for a particular piece of data, a list of pieces of data, one or more data packets, etc.

For example, the data request can be a request for firmware update data pieces 1-10 for device type B, which might be a particular firmware update which the receiver device 104 having type B needs.

As another example, the data request can be a request for firmware update data piece 1 of 5 for device type A, which might be a particular firmware update which the receiver device 104 having type A needs, but having not fully received and/or stored during the broadcast of the data previously. For example, the receiver device 104 has already received and stored to its non-transitory memory firmware update data pieces 2-5 for type A during the broadcast (204 shown in FIG. 2) of the data when the receiver device 102 requested the data from the sender device 100.

It is also possible that the receiver device 104 can communicate 212 to the sender device 100 that all of the data pieces it needs have already been received. Then, the sender device 100 can move on to communicating with one of the other receiver devices 106, 108, 110 (i.e., skip the step shown in FIG. 5).

Figure 5:
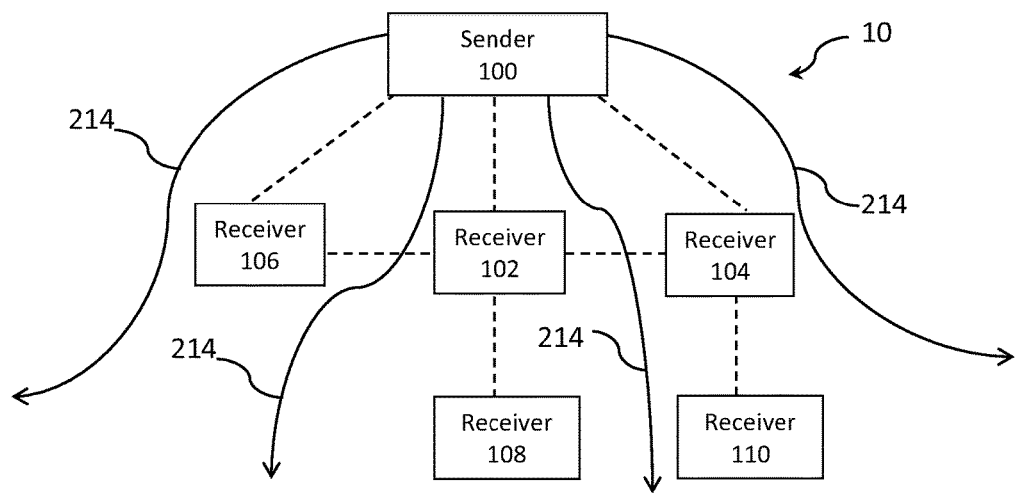

FIG. 5 shows the sender device 100 transmitting 214 (e.g., broadcasting wirelessly) the data requested by the receiver device 104, if, for example, the receiver device 104 makes such request. The sender device 100 does not need to consider what the other receiver devices 102, 106, 108, 110 require at this time. The data transmitted by the sender device 100 can be received by the receiver device 104 as well as the other receiver devices 102, 106, 108, 110. Similar to the step shown in FIG. 2, the other receiver devices 102, 106, 108, 110 can "eavesdrop" on this transmission. That is, although the broadcast data from the sender device 100 is in response to and for the receiver device 104, the other receiver devices 102, 106, 108, 110 are configured to receive the data. The other devices 102, 106, 108, 110 can determine whether the received data (e.g., firmware update data piece 1 of 5 for device type A) is appropriate. That is, if one or more of the other receiver devices 102, 106, 108, 110 are of the type A, and they have also missed the data requested by the receiver device 104, these receiver devices are provided another opportunity to "eavesdrop" and capture the data. So that when the sender device 100 communicates to that one or more of the receiver devices 106, 108, 110, that particular receiver device 106, 108, 110 might already have all of the data it needs. And thus, the communication from the sender device 100 to each of the receiver devices 106, 108, 110 can take a shorter amount of time with each broadcast by the sender device 100. Thus, it is possible that one or more of the receiver devices 102, 104, 106, 108, 110 can acquire all or parts of the data it needs by "eavesdropping" in the communication between the sender device 100 and any of the other receiver devices 102, 104, 106, 108, 110.

The receiver devices 102, 104, 106, 108, 110 can store the data they receive via broadcast and can make a determination of which pieces it might be missing when the sender device 100 requests such information (e.g., communicates with a particular receiver device).

The data (or piece of the data) can have a device type component which identifies the type of device the data is for, instead of a unique/specific device address. Thus, the data can be received by one or more receiver devices 102, 104, 106, 108, 110 and if one or more of the receiver devices 102, 104, 106, 108, 110 match the device type identified by the device type component of the data, the one or more of the receiver devices 102, 104, 106, 108, 110 would store the data (or piece of the data) to its respective non-transitory memory.

In an example where the data is firmware update data and a particular one or more of the receiver devices 102, 104, 106, 108, 110 has received all of the pieces of the data, the one or more of the receiver devices 102, 104, 106, 108, 110 can operate via its processor to update its firmware. The updating of the firmware can be performed after checking whether the received data is newer than the firmware it is using. The updating of the firmware can be performed without checking whether the received data is newer than the firmware it is using.

In an embodiment, the receiver devices 102, 104, 106, 108, 110 are set to receive broadcast data by communication via the network 10.

In another example, after the node 102 has received the entire file (e.g., all of the data packets which form the complete file), the sender device 100 can communicate instructions to the node 102 for the node 102 to use the same method (e.g., broadcasting the data pieces) so that the node 102 acts as the sender device. Accordingly, the node 108 can acts as the receiver device. The receiver device 108 might already have received some or all of the data, because even though it is two "hops" away from node 100 in the network 10 (via network routing), the receiver device 108 might be able to receive one or more broadcasted data packets from node 100. Thus, the receiver device 108 can communicate with the node 102 and request from the node 102 the pieces of the data that the receiver device 108 is missing. Further, during the transfer of the data requested by the receiver device 108 from the node 102, the node 102 can be configured to communicate data transfer progress report(s) to the node 100.

As an example, for ten nodes (receiver devices) in radio range of the sender device, out of thirty nodes, the sender device can broadcast firmware updates based on just one of the node's needs, and the other nine nodes in range can receive and store whatever/whichever pieces of the firmware data packets that has been broadcast by the sender device, so that when the sender device communicates to each of the other nine nodes, these nodes would likely have at least one or some of the data packets already received and stored into their respective non-transitory memories, or possibly even all of the data packets.

As another example, a computer device can store data that was broadcast by a sender device, although the data was not specifically targeted for that computer device.

FIG. 6 shows an embodiment of a node device 300 (e.g., one or more of the devices 100, 102, 104, 106, 108 shown in FIGS. 1-5). The node device 300 includes a processor 302, a non-transitory memory 304, and a network interface 306. The processor 302 executes computer-readable instructions 308 for performing one or more of the exemplary methods described above and shown in FIGS. 1-5). When the processor 302 executes the computer-readable instructions, broadcast data packets are received (e.g., eavesdropped) via the network interface 306, and then stored on the non-transitory memory 304.

Aspects

It is noted that any of the features in any of the aspects below can be combined with any of the other aspects.

1. A computer-implemented method for controlling data communication for one or more devices connected in a network, comprising:
    a first device receiving a request for data from a second device; and
    the first device broadcasting to the network the data that was requested by the second device.

2. The computer-implemented method according to aspect 1, further comprising:
    a third device eavesdropping on the broadcasting by the first device;
    the third device receiving the data;
    the third device having a processor that executes a computer-executable instructions and determining whether the data is appropriate for the third device; and
    the third device storing the data to a non-transitory computer-readable memory of the third device when the third device has determined that the data is appropriate for the third device.

3. The computer-implemented method according to any of the aspects 1-2, further comprising:
    the second device sending the request of the data to the first device via unicasting.

4. The computer-implemented method according to any of the aspects 1-3, further comprising:
    the second device broadcasting the request of the data to the network.

5. A non-transitory computer-readable memory including computer-readable instructions for controlling data communication for one or more devices in a network, comprising instructions stored thereon, that when executed on a processor, performs one or more of the methods in any of the aspects 1-4.

6. A network system, comprising:
    one or more node devices connected via a network;
    a controller device configured for communicating with the one or more node devices via the network, wherein each of the one or more node devices comprises a processor, a non-transitory computer-readable memory, and a network interface, wherein the processor includes a computer-executable instructions that when executed by the processor transmits a request for data via the network interface to the controller device, and the computer-executable instructions when executed by the processor broadcasts the data to the network.

7. The network system according to aspect 6, wherein at least one of the one or more node devices which did not communicate the request for the data to the controller device further includes a computer-executable instructions that when executed by the processor performs the steps of:
    eavesdropping the data broadcasted by the controller device; and
    storing the data broadcasted by the controller device to the non-transitory computer-readable memory.

8. A communication method between computer devices in a network, comprising:
    a first device transmitting a request for data to a controller device;
    the controller device receiving the request from the first device;
    the controller device broadcasting the data requested by the first device to the network;
    one or more other devices other than the first device receiving the data via broadcast from the controller device; and
    each of the one or more other devices storing the data to a respective non-transitory computer-readable memory.

9. The communication method according to aspect 8, further comprising:
    the one or more other devices transmitting another request for another data to the controller device;

the controller device receiving the another request from the one or more other devices;
the controller device broadcasting the another data requested by the one or more other devices to the network;
the first device receiving the another data via broadcast from the controller device; and
the first device storing the another data to a non-transitory computer-readable memory of the first device.

10. The communication method according to any of the aspects 8-9, further comprising:
the first device receiving the data via broadcast from the controller device; and
the first device storing the data to a non-transitory computer-readable memory of the first device.

11. A method for controlling data communication for one or more devices in a network, comprising:
a first receiver device requesting data from a sender device;
the sender device broadcasting data requested by the first receiver device.

12. The method according to aspect 11, further comprising:
a second receiver device eavesdropping on the sender device broadcasting the data;
the second receiver device receiving the data;
the second receiver device determining whether the data is appropriate for the second receiver device; and
the second receiver device storing the data if the second receiver has determined that the data is appropriate for the second receiver device.

13. A non-transitory memory including computer-readable instructions for performing the method as in any of the aspects 11-12.

14. A network system, comprising:
one or more node devices connected via a network;
a controller device configured to communicate with the one or more node devices via the network, wherein the one or more node devices is configured to transmit a data request to the controller device, and the controller device is configured to broadcast the data requested to one or more node devices.

15. The network system according to aspect 14, wherein one of the one or more node devices which did not communicate the data request to the controller device is configured to receive the data broadcasted by the controller device, and store the data broadcasted by the controller device to a non-transitory memory.

16. A network system, comprising:
a first receiver device, a second receiver device, and a sender device connected to a network, wherein the first receiver device controls the sender device to broadcast data, and the first receiver device and the second receiver device both can receive the data.

17. A network device connected to a network having a sender device in communication with a receiver device, wherein the network device is configured to receive data broadcasted by the sender device, wherein the data is broadcasted by the sender device in response to a data request transmitted from the receiver device to the sender device.

18. A communication method between devices in a network, comprising:
a first device transmitting a data request to a controller device;
the controller device transmitting the data requested by the first device to the first device.

19. The communication method according to aspect 18, wherein the transmitting the data is via broadcast.

20. The communication method according to any of the aspects 18-19, wherein the transmitting the data is via wireless broadcast.

21. The communication method according to any of the aspects 18-20, wherein the transmitting the data is via transmission of radiation.

22. The communication method according to any of the aspects 18-21, further comprising:
the first device receiving the data;
the first device storing the data to a non-transitory memory of the first device; and
the first device does not perform a tracking of the data that has been stored to the non-transitory memory.

23. The communication method according to any of the aspects 18-22, further comprising:
one or more other devices receiving the data;
the one or more other devices storing the data to a respective non-transitory memory of the one or more other devices; and
the one or more other devices do not perform a tracking of the data that has been stored to the non-transitory memory.

With regard to the foregoing description, it is to be understood that changes may be made in detail without departing from the scope of the present invention. It is intended that the specification and depicted embodiment to be considered exemplary only, with a true scope and spirit of the invention being indicated by the broad meaning of the claims.

What is claimed is:

1. A computer-implemented method for controlling data communication for one or more devices connected in a network, wherein the one or more devices include a first device, a second device, and a third device, wherein the first device having a non-transitory computer-readable memory, and firmware data is stored in the non-transitory computer-readable memory of the first device, the method comprising:
the second device transmitting a request of the firmware data to the network;
the first device receiving the request for the firmware data from the second device;
the first device broadcasting to the network the firmware data that was requested by the second device;
the third device receiving the firmware data that was broadcasted by the first device;
the third device having a processor that executes a computer-executable instructions and determining whether the firmware data is appropriate for the third device;
the third device storing the firmware data to a non-transitory computer-readable memory of the third device when the third device has determined that the firmware data is appropriate for the third device; and
the processor of the third device determining that there is missing data in the firmware data received via the broadcasting from the first device;
the third device transmitting a request for only the missing data to the first device;
the first device receiving the request for the missing data from the third device; and
the first device responding to the request for the missing data by broadcasting only the missing data to the network.

2. The computer-implemented method according to claim 1, further comprising:

the second device transmitting the request of the firmware data to the first device is via unicasting to the first device.

3. The computer-implemented method according to claim 1, wherein the network is a mesh network, and the first device, the second device, and the third device are connected to the mesh network.

4. The computer-implemented method according to claim 1, wherein the network is a wireless radio network, and the first device, the second device, and the third device are connected to the wireless radio network.

5. The computer-implemented method according to claim 1, wherein the network is a ZigBee network, and the first device, the second device, and the third device are connected to the ZigBee network.

6. The computer-implemented method according to claim 1, wherein the first device broadcasting uses a radio frequency.

7. The computer-implemented method according to claim 1, wherein the broadcast uses a radio frequency.

8. A network system, comprising:
one or more node devices connected via a network;
a controller device configured for communicating with the one or more node devices via the network, wherein each of the one or more node devices comprises a processor, a non-transitory computer-readable memory, and a network interface, wherein the processor includes a computer-executable instructions that when executed by the processor transmits a request for firmware data via the network interface to be received by the controller device, and the computer-executable instructions when executed by the processor broadcasts the firmware data to the network,
wherein at least one of the one or more node devices which did not communicate the request for the firmware data to the controller device further includes a computer-executable instructions that when executed by the processor performs the steps of:
storing the firmware data broadcasted by the controller device to the non-transitory computer-readable memory;
determining whether there is missing data from the firmware data stored to the non-transitory computer-readable memory; and
transmitting a request to the controller device for only the missing data,
wherein the controller device is configured to receive the request for the missing data and responding to the request for the missing day by broadcasting only the missing data to the network.

9. The network system according to claim 8, wherein the network is a mesh network.

10. The network system according to claim 8, wherein the network is a wireless radio network.

11. The network system according to claim 8, wherein the network is a ZigBee network.

12. A communication method between computer devices in a mesh network, comprising:
a first device transmitting a request for firmware data for being received by a controller device via the mesh network;
the controller device receiving the request for the firmware data from the first device via the mesh network;
the controller device broadcasting the firmware data requested by the first device to the mesh network;
one or more other devices other than the first device being configured to receive the broadcasting of the firmware data by the controller device, and receiving the firmware data via broadcast from the controller device;
each of the one or more other devices storing the firmware data to a respective non-transitory computer-readable memory; and
each of the one or more other devices independently determining whether there is missing data in the firmware data stored in the respective non-transitory computer-readable memory, and when each of the one or more other devices independently determines that there is missing data, each of the one or more other devices independently transmitting a request for only the respective missing data to the controller device.

13. The communication method according to claim 12, further comprising:
the one or more other devices transmitting another request for another data to the controller device via the mesh network;
the controller device receiving the another request from the one or more other devices via the mesh network;
the controller device broadcasting the another data requested by the one or more other devices to the mesh network;
the first device receiving the another data via broadcast from the controller device; and
the first device storing the another data to a non-transitory computer-readable memory of the first device.

14. The communication method according to claim 12, further comprising:
the first device receiving the firmware data via broadcast from the controller device; and
the first device storing the firmware data to a non-transitory computer-readable memory of the first device.

* * * * *